United States Patent [19]

Hirooka et al.

[11] Patent Number: 4,565,901

[45] Date of Patent: Jan. 21, 1986

[54] GAS-INSULATED ELECTRIC DEVICE

[75] Inventors: Koichi Hirooka, Osaka; Setsuyuki Matsuda; Yoshikuni Arahata, both of Kobe, all of Japan

[73] Assignee: Mitsubishi Denki Kabushiki Kaisha, Tokyo, Japan

[21] Appl. No.: 618,823

[22] Filed: Jun. 8, 1984

[30] Foreign Application Priority Data

Jun. 14, 1983 [JP] Japan ................................. 58-108177

[51] Int. Cl.⁴ .............................................. H01B 3/16
[52] U.S. Cl. ............................. 174/17 GF; 174/25 G; 174/26 G; 200/146 AA; 200/148 G; 252/372; 252/571; 336/94; 361/327
[58] Field of Search ............................. 252/372, 571; 174/17 GF, 25 G, 26 G; 200/146 AA, 148 G; 336/94; 361/327

[56] References Cited

U.S. PATENT DOCUMENTS 3,048,648  8/1962  Plump et al. ........................ 252/571
4,257,905  3/1981  Christophorou et al. .......... 252/571

OTHER PUBLICATIONS

J. C. Devins, "Replacement Gases for $SF_6$", Proc. Conference on Electrical Insulation and Dielectric Phenomena, pp. 398–408, (1977).

Primary Examiner—A. Lionel Clingman
Assistant Examiner—Robert A. Wax
Attorney, Agent, or Firm—Wenderoth, Lind & Ponack

[57] ABSTRACT

A gas-insulated electric device comprising an electric conductor disposed in a sealed vessel filled with an insulating gas, the conductor being supported by a solid insulating member. The insulating gas is a nitrilic fluorocarbon compound or a mixture of a nitrilic fluorocarbon compound and $SF_6$. In this device, the dielectric strength is increased. Accordingly, the size of the device can be decreased.

1 Claim, 6 Drawing Figures

GAS-INSULATED ELECTRIC DEVICE

BACKGROUND OF THE INVENTION

1. Field of the Invention

The present invention relates to a gas-insulated electric device.

2. Description of the Prior Art

Recently, in order to cope with land or environmental problems, gas-insulated electric devices, especially gas-insulated switching devices, have become widely used. A conventional electric device of this type has a structure shown in FIG. 1, and comprises a vessel 1 in which a gas 2 of high insulating strength is sealed and in which a high voltage conductor 3 is supported by a solid insulator 4. $SF_6$ gas is frequently used as the insulating gas.

A reduction of the size of this type of conventional device and an increase in the performance thereof will be advantageously attained if an insulating gas having better insulating characteristics than $SF_6$ gas can be applied.

SUMMARY OF THE INVENTION

It is a primary object of the present invention to provide a gas-insulated electric device in which a gas having excellent insulating characteristics is used under conditions not liquefying the gas, thereby reducing the size and increasing the performance of the device as compared with conventional devices.

In accordance with the present invention, there is provided a gas-insulated electric device comprising an electric conductor disposed in a sealed vessel filled with an insulating gas, the electric conductor being supported by a solid insulating member, wherein the insulating gas is a nitrilic fluorocarbon compound.

BRIEF DESCRIPTION OF THE DRAWINGS

FIG. 2b shows the disposition of electrodes used in the breakdown voltage test performed to obtain the data of FIG. 2a.

DETAILED DESCRIPTION OF THE PREFERRED EMBODIMENTS

The present invention will now be described in detail.

Insulating gases used for carrying out the present invention are shown in Table 1. Both gases are commercially available as industrial chemial grade reagent.

TABLE 1

| Chemical Formula | Compound Name | Purity |
|---|---|---|
| $CF_3CN$ | trifluoroacetonitrile | 99.7% |
| $C_2F_5CN$ | pentafluoropropionitrile | 99.8% |

Figure 1:
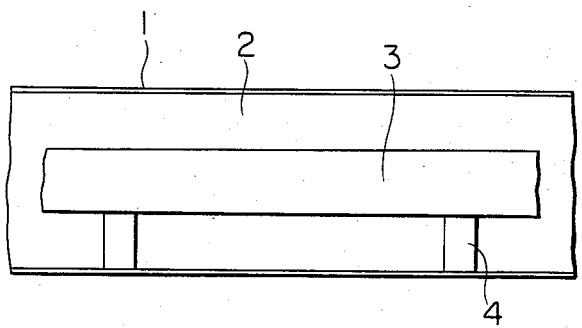
FIG. 1 is a longitudinal sectional view illustrating a conventional gas-insulated electric device.
Figure 2A:
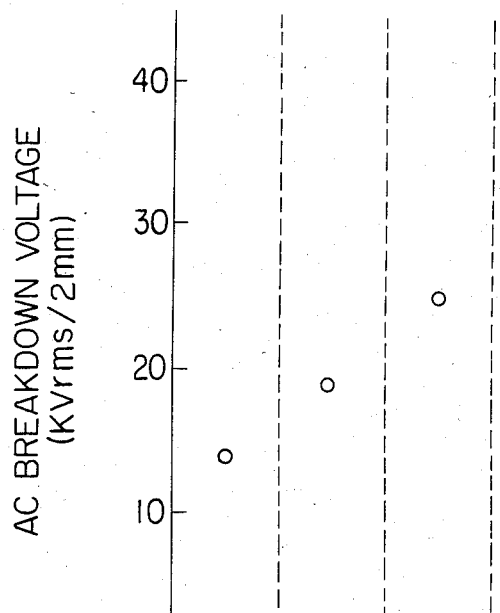
FIG. 2a is a diagram illustrating the insulating characteristics of $C_2F_5CN$, $CF_3CN$, and $SF_6$ gases.
Figure 2B:
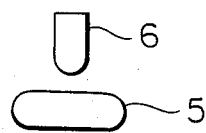

The results of measurements of the insulating characteristics of the above insulating gases are shown in FIG. 2a. Each insulating gas was sealed in an acrylic resin vessel having a capacity of 2 liters under atmospheric pressure at 20° C., and the AC breakdown voltage was measured using a round-edged horizontally-disposed electrode 5 having a width of 80 mm and a perpendicular electrode 6 disposed centrally to and spaced 2 mm from the horizontal electrode 5, as shown in FIG. 2b. It is seen that the ratios of the breakdown voltages of both gases to the breakdown voltage of $SF_6$ are greater than 1; the ratio for $CF_3CN/SF_6$ equals 1.4, and that for $C_2F_5CN/SF_6$ is 1.8.

Since the liquefaction of the insulating gas should be avoided, the vapor pressure characteristic of each insulating gas was measured in the following manner in order to clarify the vapor-liquefaction characteristics.

Figure 3:
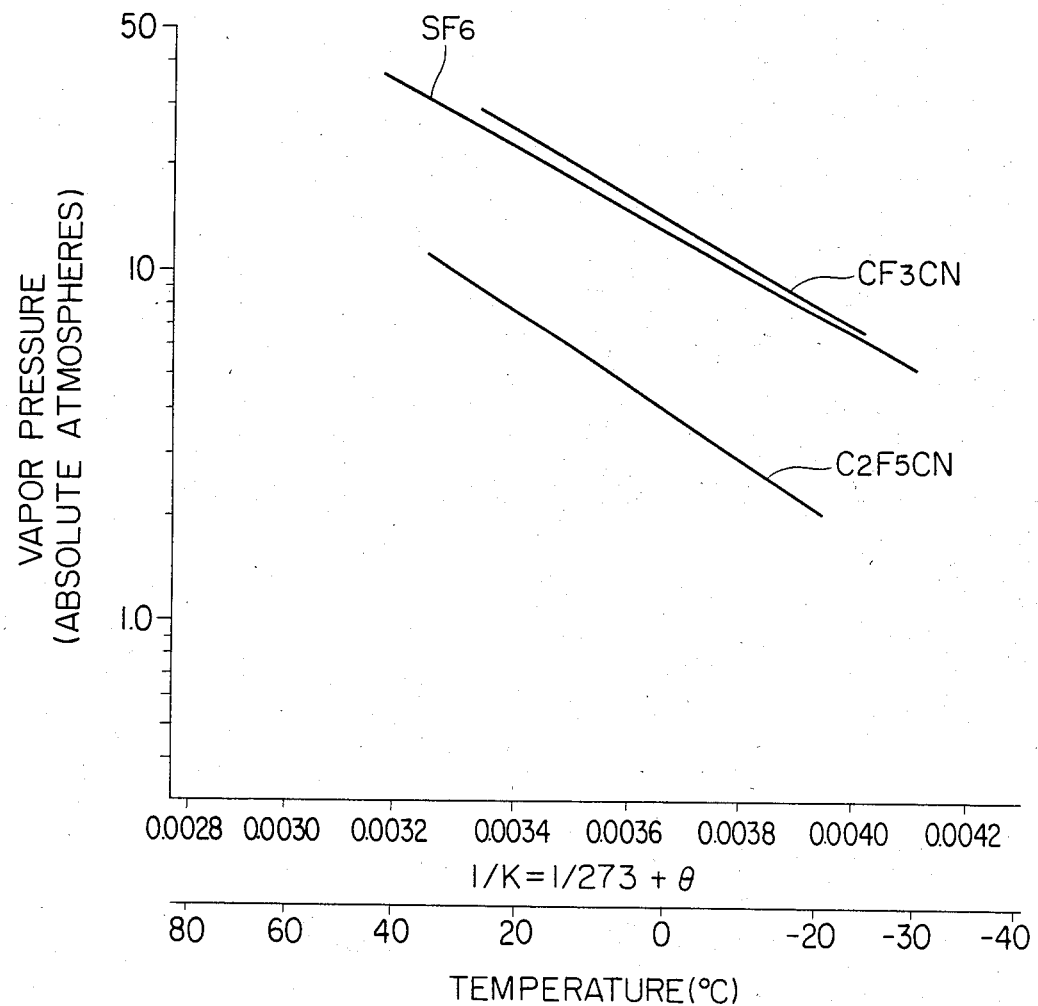
FIG. 3 is a diagram showing the vapor pressures of $SF_6$, $C_2F_5CN$ and $CF_3CN$ gases.

Bombs filled with each insulating gas kept in a liquid state were placed in a thermostatic chamber and a pressure gauge was connected to each bomb. The vapor pressure in each bomb was measured at various temperatures. The results are shown in FIG. 3. It was found that there is a linear relationship between the vapor pressure and the reciprocal of the temperature employed expressed as an absolute temperature. This relationship conforms to the Clausius-Clapayron formula.

The AC breakdown voltage of the insulating gases shown in Table 1 or a mixture of either one of the insulating gases shown in Table 1 with $SF_6$ gas under conditions not causing liquefaction will now be described. For a given sealing pressure ($P_T$) of a gas mixture comprising $SF_6$ and one of the gases in Table 1, the relation between the sealing pressure ($P_T$) and the mole fraction (k) of $SF_6$ in the gas mixture is as follows:

$$P_T = p_{FC} \quad \text{(when } P_T \leq P_{FC}\text{)}$$

$$P_T = p_{FC} + p_{SF_6} \quad \text{(when } P_T > P_{FC}\text{)}$$

$$k = p_{SF_6}/P_T$$

wherein $P_T$ stands for the sealing pressure (absolute pressure, 20° C.) at which the gas mixture is sealed in a device, $p_{FC}$ stands for the partial pressure (absolute pressure) of one of the gases shown in Table 1 1 at 20° C. (which is determined from FIG. 3 according to the lower limit of the temperature used in the device; examples at temperatures of −20°, −10°, 0°, 10° and 20° C. are shown in Table 2), $P_{FC}$ stands for the saturated vapor pressure (absolute pressure) of the same gas at 20° C., $p_{SF_6}$ stands for the partial pressure (absolute pressure) of $SF_6$ gas when sealed at 20° C., and k stands for the mole fraction of $SF_6$ gas in the gas mixture.

If it is assumed that the addition of one of the gases in Table 1 to $SF_6$ has a linear compositional effect on breakdown voltage then the AC breakdown voltage ($V_m$) of the gas mixture is given by the following formula:

$$V_m = V_{SF_6}[k + (1-k)R_{FC/SF_6}]$$

wherein $V_m$ stands for the AC breakdown voltage ($kV_{rms}$) of the gas mixture, $V_{SF_6}$ stands for the AC breakdown voltage ($kv_{rms}$) of $SF_6$ gas, and $R_{FC/SF_6}$ stands for the ratio of the breakdown voltage of the insulating gas to that of $SF_6$ gas (see FIG. 2a).

Figure 4:
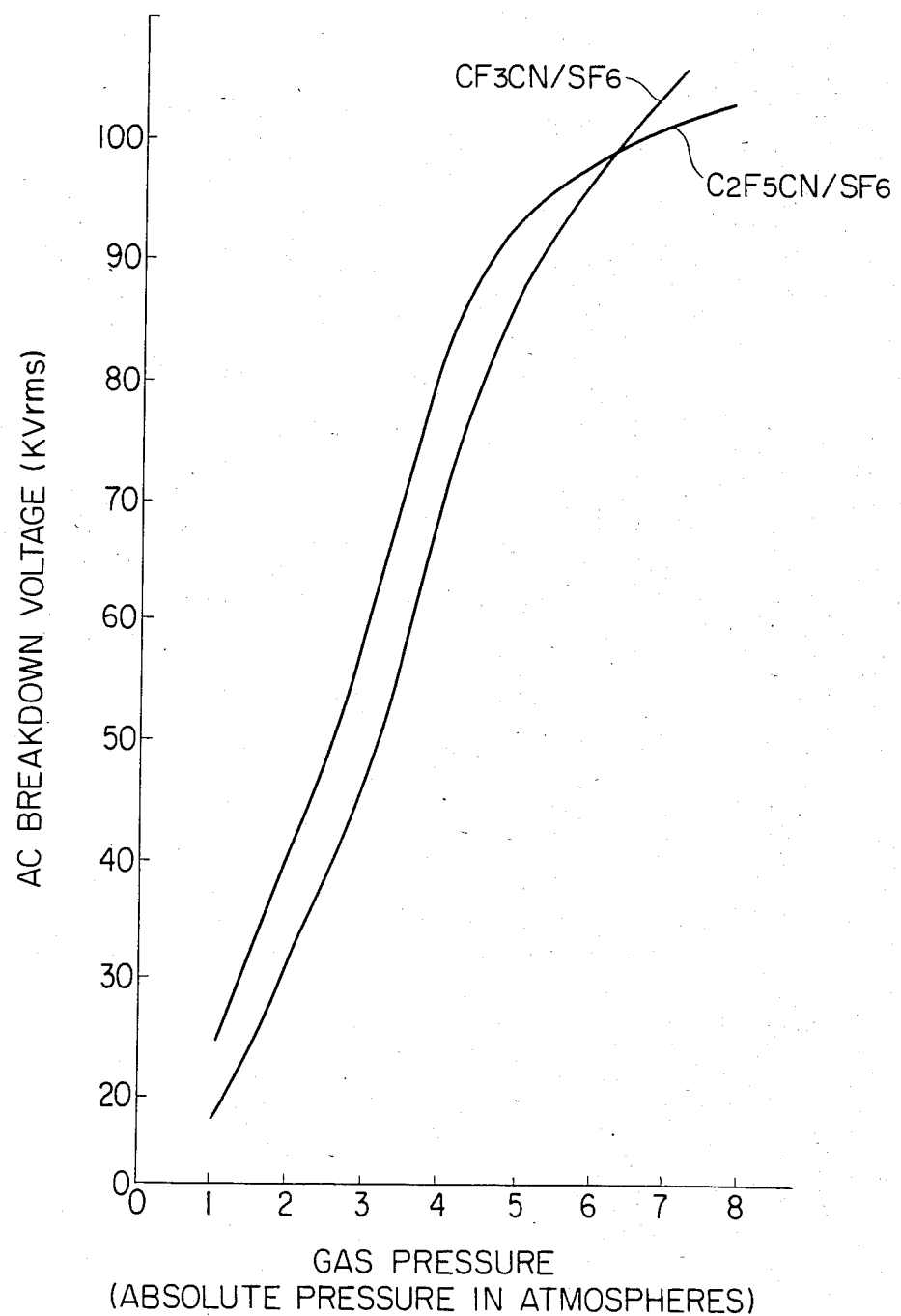
FIG. 4 is a diagram illustrating the AC breakdown voltage ($V_m$) and sealing pressure ($P_T$) of gaseous mixtures of $SF_6$ with $C_2F_5CN$ and $CF_3CN$.

In FIG. 4, the relation between $V_m$ and $P_T$ is plotted for the case when the lower limit of the temperature used in the device is $-10°$ C. using the electrode system shown in FIG. 2b. Similar diagrams can be drawn for other lower limit temperatures such as $-20°$, $0°$, $10°$ and $20°$ C. These diagrams can be obtained when the characteristics shown in FIGS. 2a and 3 are known.

TABLE 2

| State | Sample | | |
|---|---|---|---|
| | $CF_3CN$ | $C_2F_5CN$ | $SF_6$ |
| *vapor pressure at $-20°$ C. | 7.40 | 1.92 | 7.16 |
| pressure at $20°$ C. when sealed at $-20°$ C. | 8.57 | 2.22 | 8.23 |
| vapor pressure at $-10°$ C. | 10.2 | 2.77 | 9.80 |
| pressure at $20°$ C. when sealed $-10°$ C. | 11.4 | 3.09 | 10.92 |
| vapor pressure at $0°$ C. | 14.8 | 3.96 | 13.04 |
| pressure at $20°$ C. when sealed at $0°$ C. | 15.9 | 4.25 | 14.00 |
| vapor pressure at $10°$ C. | 18.2 | 5.45 | 16.6 |
| pressure at $20°$ C. when sealed at $10°$ C. | 18.8 | 5.64 | 17.2 |
| vapor pressure at $20°$ C. | 24.9 | 7.30 | 21.7 |
| pressure at $20°$ C. when sealed at $20°$ C. | 24.9 | 7.30 | 21.7 |

*All pressures given in absolute atmospheres

Table 3 shows the mole fraction (k) of $SF_6$ and the ratio of breakdown voltages ($V_m/V_{SF_6}$) for gas mixtures of $SF_6$ and $C_2F_5CN$ or $CF_3CN$ having various lower limit temperatures in a gas-insulated switch with a sealing pressure of 4 atmospheres at $20°$ C.

TABLE 3

| Lower Limit Temperature | Insulating Gas | | | | | | | |
|---|---|---|---|---|---|---|---|---|
| | $C_2F_5CN$ | | | | $CF_3CN$ | | | |
| | $P_{FC}$ | $P_{SF_6}$ | k | $V_m/V_{SF_6}$ | $P_{FC}$ | $P_{SF_6}$ | k | $V_m/V_{SF_6}$ |
| $-20°$ C. | 2.22 | 1.78 | 0.45 | 1.4 | 4 | 0 | 0 | 1.4 |
| $-10°$ C. | 3.09 | 0.91 | 0.23 | 1.6 | 4 | 0 | 0 | 1.4 |
| $0°$ C. | 4.00 | 0 | 0 | 1.8 | 4 | 0 | 0 | 1.4 |
| $10°$ C. | 4.00 | 0 | 0 | 1.8 | 4 | 0 | 0 | 1.4 |
| $20°$ C. | 4.00 | 0 | 0 | 1.8 | 4 | 0 | 0 | 1.4 |

All pressures are absolute pressures measured in atmospheres

Referring to Table 3, when the lower limit temperature is $0°$ C., the ratio of the breakdown voltage of $C_2F_5CN$ to that of $SF_6$ gas is 1.8. Supposing that the sealing pressure is 1.5 atmospheres (absolute pressure) for a gas transformer, a cubicle GIS, or a gas bushing-type transformer, even if the lower limit temperature is $-20°$ C., the ratio of the breakdown voltage of $C_2F_5CN$ to $SF_6$ gas is 1.8. Since the insulating characteristics are excellent, the size of the device can be diminished.

If this insulating gas is used to fill a conventional $SF_6$ gas-insulated device under the same pressure as adopted for $SF_6$ gas, the rated voltage is 1.8 times the conventional rated voltage. In the $SF_6$ gas-insulated device, the rated voltage can be increased by increasing the pressure of the $SF_6$ gas. However, in order to increase the $SF_6$ gas pressure, the specifications of the device must be changed; for example, the thickness of the sealed vessel must be increased, which results in an increase in the weight and price of the device. On the other hand, if the insulating gas of the present invention is used, the rated voltage is increased under the same gas pressure, and therefore, the rated voltage of the existing facilities can be increased without any modification of the device.

Ordinarily, in the insulation design of a gas-insulated device, the lightning impulse withstand voltage of the device is the most important parameter. The lightning impulse withstand voltages of devices of 500 kv, 275 kv, and 154 kv are 1550 kv, 1050 kv, and 750 kv, respectively. The ratio of the lightning impulse voltage of a device of 500 kv to that of a device of 275 kv is 1.47, and the ratio of the impulse lightning voltage of a device of 275 kv to a device of 154 kv is 1.4. Accordingly, if a gas mixture comprising 45% of $SF_6$ and 55% of $C_2F_5CN$ is sealed in a gas-insulated device of 154 kv designed for $SF_6$ gas, since the insulating characteristics are increased 1.4 times as shown in Table 3, the device corresponds to a device rated at 275 kv. Furthermore, this device can be used in a place where the temperature is lowered to $-20°$ C. When a gas mixture comprising 37% of $SF_6$ and 63% of $C_2F_5CN$ is used, the device can be used in a place where the temperature is lowered to about $-15°$ C. and the voltage resistance is 1.5 times as high as that of a device filled with $SF_6$. Accordingly, a device rated at 275 kv when filled with $SF_6$ gas can be used as a 500 kv device when it is filled with the above-mentioned mixed gas.

Voltages of most substation facilities in Japan are 500-275 kv and 275-154 kv. Accordingly, the rated voltages can be advantageously increased merely by exchanging the gas in the existing facilities.

Figure 5:
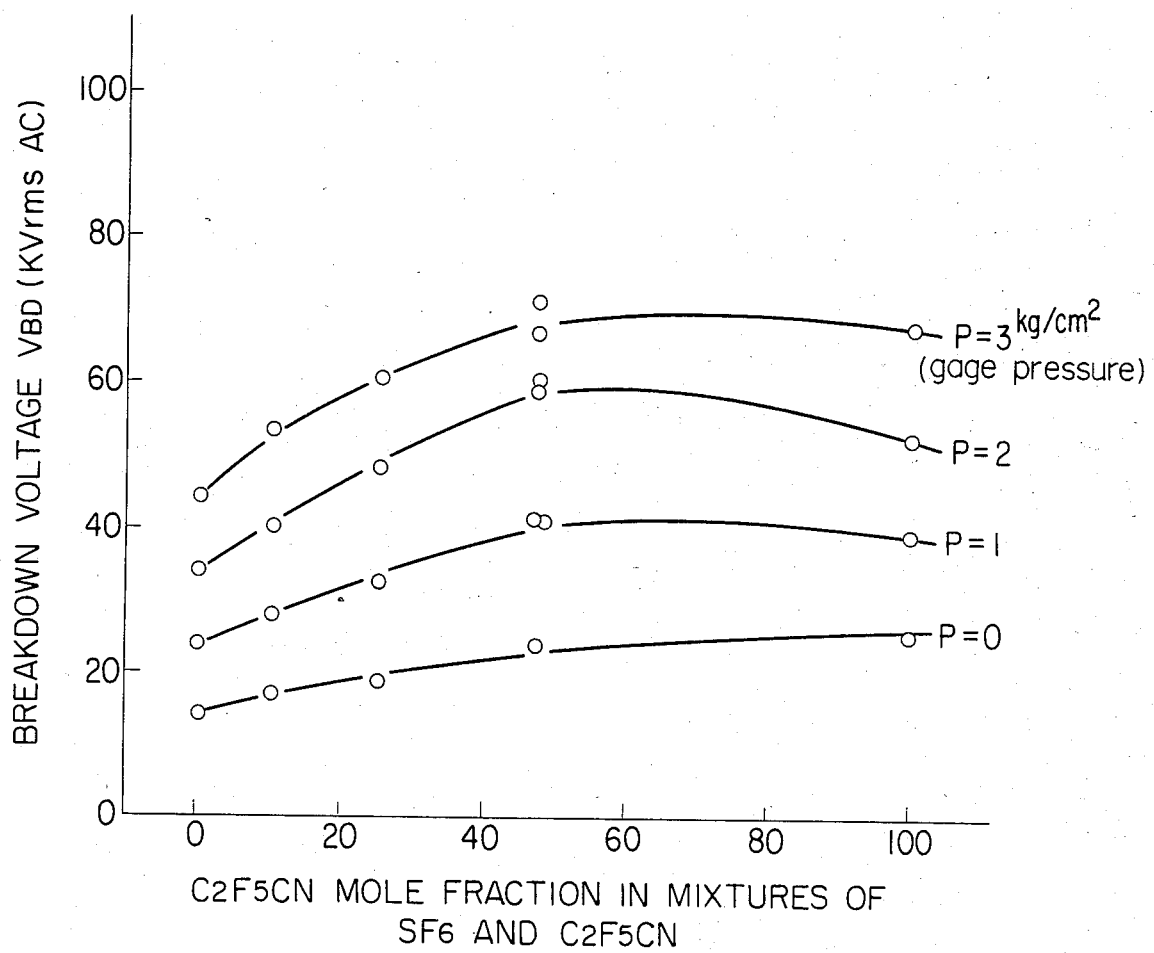
FIG. 5 is a diagram illustrating the relation between the mole fraction of $C_2F_5CN$ and the breakdown voltage of gas mixtures of $C_2F_5CN$ and $SF_6$ for 4 different pressures.

The results of the measurement of the relationship between the ratio of $SF_6$ to $C_2F_5CN$ in a gas mixture and the breakdown voltage at $20°$ C. are shown in FIG. 5 using the electrode system shown in FIG. 2b. From the results shown in FIG. 5, it is seen that the relationship is expressed by an upwardly convex curve. Namely, the breakdown voltage is increased beyond the theoretical value by the synergistic effects of the components of the gas mixture. This is advantageous from the standpoint of the design of a device.

A model simulating an actual device corresponding to a 154 kv-class device was filled with a gas comprising 24% of $C_2F_5CN$ and 76% of $SF_6$ under a pressure of 1.5 atmospheres (absolute pressure), and when the breakdown voltage was examined, it was seen that the ratio of the AC breakdown ratio of the gas mixture to that of $SF_6$ was 1.3, which is equal to the theoretical value obtained according to the above-mentioned formula.

The invention has been described with reference to a one-component or two-component gas system. However, similar effects can be attained with a gas system comprising three or more components. Since it may be considered that the lower limit temperature is about $20°$ C. in a high-temperature region, pressures lower than the vapor pressure at $20°$ C., shown in Table 3, are effective as the partial pressure of the one-component gas or a gas mixture.

Furthermore, when $CF_3CN$ is used, attainment of an effect similar to the effect attained by $C_2F_5CN$ can be expected.

According to the present invention, by using a gas of a nitrilic fluorocarbon compound for insulation, the dielectric strength can be increased and therefore, the size of the device can be decreased. Furthermore, when a gas mixture of a nitrilic fluorocarbon compound and $SF_6$ is used, a synergistic effect is attained and the dielectric strength can be further improved.

What is claimed is:

1. A gas-insulated electric device comprising an electric conductor disposed in a sealed vessel filled with an insulating gas, said conductor being supported by a solid insulating member, wherein the insulating gas is a mixture comprising 10-60 mole % of $C_2F_5CN$ and 40-90 mole % of $SF_6$.

* * * * *